(12) United States Patent
Cheng et al.

(10) Patent No.: US 9,742,282 B2
(45) Date of Patent: Aug. 22, 2017

(54) SWITCHING POWER VOLTAGE REGULATOR FOR REGULATING ELECTRIC ENERGY TO LOAD

(71) Applicant: Fitipower Integrated Technology, Inc., Hsinchu (TW)

(72) Inventors: Chih-Nan Cheng, Hsinchu (TW); Shang-Cheng Yu, Hsinchu (TW)

(73) Assignee: Fitipower Integrated Technology, Inc., Hsinchu (TW)

( * ) Notice: Subject to any disclaimer, the term of this patent is extended or adjusted under 35 U.S.C. 154(b) by 73 days.

(21) Appl. No.: 14/472,724

(22) Filed: Aug. 29, 2014

(65) Prior Publication Data

US 2015/0061616 A1    Mar. 5, 2015

(30) Foreign Application Priority Data

Aug. 30, 2013  (TW) .............................. 102131160 A

(51) Int. Cl.
*G05F 1/00* (2006.01)
*H02M 3/158* (2006.01)
*H02M 1/00* (2006.01)
*H02M 1/088* (2006.01)

(52) U.S. Cl.
CPC ....... *H02M 3/1588* (2013.01); *H02M 3/1584* (2013.01); *H02M 1/088* (2013.01); *H02M 2001/0032* (2013.01); *Y02B 70/1466* (2013.01); *Y02B 70/16* (2013.01)

(58) Field of Classification Search
CPC .... H02M 3/156; H02M 3/158; H02M 3/1584; H02M 3/1588; H02M 2001/0032

USPC .......................... 323/271, 272, 282, 283, 351
See application file for complete search history.

(56) References Cited

U.S. PATENT DOCUMENTS

| | | | | |
|---|---|---|---|---|
| 6,380,770 | B1* | 4/2002 | Pasqualini | H03K 17/164 326/27 |
| 7,960,952 | B2* | 6/2011 | Koo | H02M 3/33523 323/272 |
| 8,217,634 | B2* | 7/2012 | Lu | H02M 3/156 323/271 |
| 8,988,059 | B2* | 3/2015 | Rutkowski | H02J 1/00 323/272 |
| 2005/0212497 | A1* | 9/2005 | Cha | H02M 3/1584 323/272 |

(Continued)

FOREIGN PATENT DOCUMENTS

| | | | |
|---|---|---|---|
| CN | 101383560 | 3/2009 | |
| CN | 104218778 A | * 12/2014 | ............ H02M 3/158 |

(Continued)

*Primary Examiner* — Alex Torres-Rivera
(74) *Attorney, Agent, or Firm* — Steven Reiss

(57) ABSTRACT

A switching power voltage regulator includes a pulse width modulation (PWM) signal generator, an output circuit and a feedback circuit. The PWM signal generator is configured to generate a PWM signal. The feedback circuit is configured to provide a feedback signal to the output circuit according to an output voltage of the output circuit. The output circuit includes an inductor, a plurality of inverters, and a driver. Each of the inverters includes a first transistor and a second transistor. When the inductor needs to be charged, the driver selectively switches one or more corresponding first transistors on according to the feedback signal.

16 Claims, 2 Drawing Sheets

(56) References Cited

U.S. PATENT DOCUMENTS

| | | | |
|---|---|---|---|
| 2005/0258811 A1* | 11/2005 | Matsuo | H02M 3/158 323/282 |
| 2006/0208715 A1* | 9/2006 | Saeki | H02M 3/1588 323/282 |
| 2009/0039842 A1* | 2/2009 | Chen | H02M 3/1584 323/272 |
| 2010/0250913 A1* | 9/2010 | Breen, III | H02M 1/38 323/282 |
| 2014/0359329 A1* | 12/2014 | Zhou | H02J 1/02 713/322 |

FOREIGN PATENT DOCUMENTS

| | | |
|---|---|---|
| TW | 200926484 A | 6/2009 |
| TW | M428391 B | 5/2012 |

* cited by examiner

SWITCHING POWER VOLTAGE REGULATOR FOR REGULATING ELECTRIC ENERGY TO LOAD

FIELD

The disclosure generally relates to circuit technologies, and more particularly to a switching power voltage regulator.

BACKGROUND

A switching power voltage regulator regulates electric energy input to a load. However, the switching power voltage regulator cannot provide different current according to different load. A current of a low load supplied from the switching power voltage regulator is the same as a current of a high load. Thus, the electricity is wasted.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
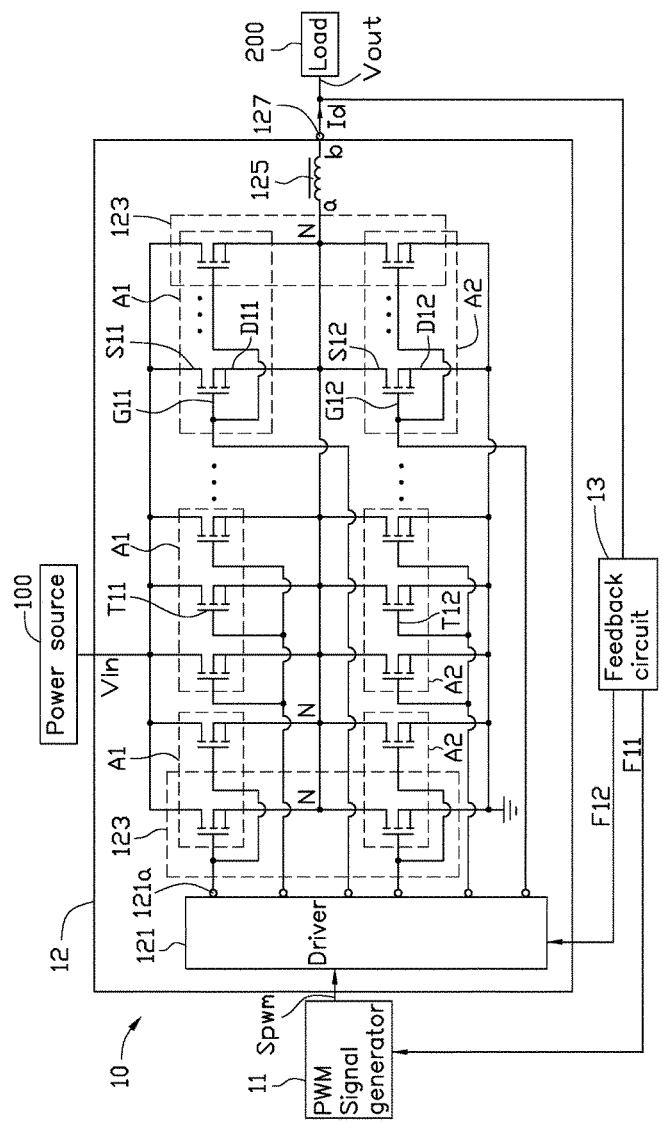
FIG. 1 is a circuit diagram of a first embodiment of a switching power voltage regulator.

FIG. 1 is a schematic circuit diagram of a first embodiment of a switching power voltage regulator. Referring to FIG. 1, the switching power voltage regulator 10 connects to a power source 100 and a load 200. The switching power voltage regulator 10 regulates a power voltage Vin output by the power source 100, and supplies an output voltage Vout to the load 200. The switching power voltage regulator 10 includes a PWM signal generator (Pulse Width Modulation Signal Generator) 11, an output circuit 12, and a feedback circuit 13. The PWM signal generator 11 is configured to generate a PWM signal Spwm. The output circuit 12 provides an output voltage Vout according to the PWM signal Spwm and supplies the output voltage Vout to the load 200. The feedback circuit 13 provides a first feedback signal F11 to the PWM signal generator 11 according to the output voltage Vout to control a conducting time or a non-conducting time of the PWM signal Spwm generated by the PWM signal generator 11. In this embodiment, the conducting time means a period during which the PWM signal is at a high weight, and the non-conducting time means a period during which the PWM signal is at a low weight. In the other embodiment, the conducting time may mean a period during which the PWM signal is at a low weight, and the non-conducting time may mean a period during which the PWM signal is at a high weight. Moreover, the feedback circuit 13 also provides a second feedback signal F12 to the output circuit 12 according to the output voltage Vout to express a weight of the load 200, and then the output circuit 12 regulates a load current Id outputting to the load 200 according to the second feedback signal F12.

The output circuit 12 includes a driver 121, a plurality of inverters 123, an inductor 125, and an output end 127. The driver 121 includes a number of output terminals 121a. Each of the inverters 123 includes a first transistor T11 and a second transistor T12. The first transistor T11 includes a control terminal G11, a first connecting terminal S11, and a second connecting terminal D11. The second transistor T12 includes a control terminal G12, a first connecting terminal S12, and a second connecting terminal D12. The connecting terminals G11 and G12 are connected to the output terminals 121a. The first connecting terminal S11 of the first transistor T11 is connected to the power source 100. The second connecting terminal D12 of the second transistor T12 is grounded. The second connecting terminal D11 of the first transistor T11 is connected to the first connecting terminal S12 of the second transistor T12, an output node N is defined between the second connecting terminal D11 of the first transistor T11 and the first connecting terminal S12 of the second transistor T12. Each of the output nodes N of the inverters 123 are connected to each other. Each of the inductors 125 includes a first connecting end a and a second connecting end b. The first connecting end a connects to the output nodes N of each inverters 123. The second connecting end b acts as the output end 127, or connects to the output end 127. In this embodiment, the first transistor T11 and the second transistor T12 are NMOS transistors. Accordingly, the control terminals G11 and G12 are gate electrodes, the first connecting terminals S11 and S12 are source electrodes, and the second connecting terminals D11 and D12 are drain electrodes.

The first transistors T11 of the inverters 123 define a plurality of first switching groups A1. Each of the first switching groups A1 includes at least one first transistor T11. The quantities of the first transistors T11 in each of the first switching groups A1 are different. The second transistors T12 of the inverters 123 define a plurality of second switching groups A2. Each of the second switching groups A2 includes at least one second transistor T12. The quantities of the second transistors T12 in each of the second switching groups A2 are different. The control terminals G11 in same switching group A1 is connected to same output terminal 121a. The control terminals G12 in same switching group A2 is connected to same output terminal 121a. In this embodiment, the quantities of the first switching groups A1 and the second switching groups A2 are the same. Each of the first switching group A1 is corresponding to one second switching group A2. The number of the first transistors T11 of each first switching group A1 is equal to the number of the second transistors T12 of the second switching group A2 corresponded to the first switching group A1.

When the inductor 125 needs to be charged, the driver 121 selectively turns one or more corresponding first transistors T11 on according to the second feedback signal F12, and controls the conducting time of the first transistors T11 according to the PWM signal Spwm. Then, the power voltage Vin charges the inductor 125 via the first transistors T11. When the inductor 125 needs to be discharged, the driver 121 selectively turns one or more corresponding second transistors T12 on according to the second feedback signal F12, and controls the conducting time of the second transistors T12 according to the PWM signal Spwm. Then, the inductor 125 is discharged via the second transistors T12. The driver 121 controls different first switching group A1 to charge the inductor 125, and controls different second switching groups A2 to discharge the inductor 125 via the second feedback signal F12 according to the load 200 in different weight.

The heavier the load 200, the more first transistors T11 are turned on by the driver 121 to charge the inductor 125, and the more second transistors T12 are turned on by the driver 121 to discharge the inductor 125. On the contrary, the lighter the load 200, the less first transistors T11 are turned on by the driver 121 to charge the inductor 125, and the less second transistors T12 turned on by the driver 121 to discharge the inductor 125.

When the load 200 is in a constant state, the driver 121 controls same first switching groups A1 to charge the inductor 125, and controls same second switching groups A2 corresponding to the first switching groups A1 to discharge the inductor 125.

The heavier the load 200, the more first transistors T11 are turned on. Each of the first transistors T11 acts as a resistance between the power source 100 and the inductor 125. The first transistors T11 are in parallel. It is understood that, the more resistances in parallel, the lower total resistor value, and the total resistor value is lower than the resistor value of each of the resistances. Thus, the heavier the load 200, the lower total resistor value between the power source 100 and the inductor 125, and the larger the load current Id outputting to the load 200 according to the second feedback signal F12. On the contrary, the lighter the load 200, the smaller the load current Id outputting to the load 200. Thus, the consumption of electricity of the load 200 is reduced.

Figure 2:
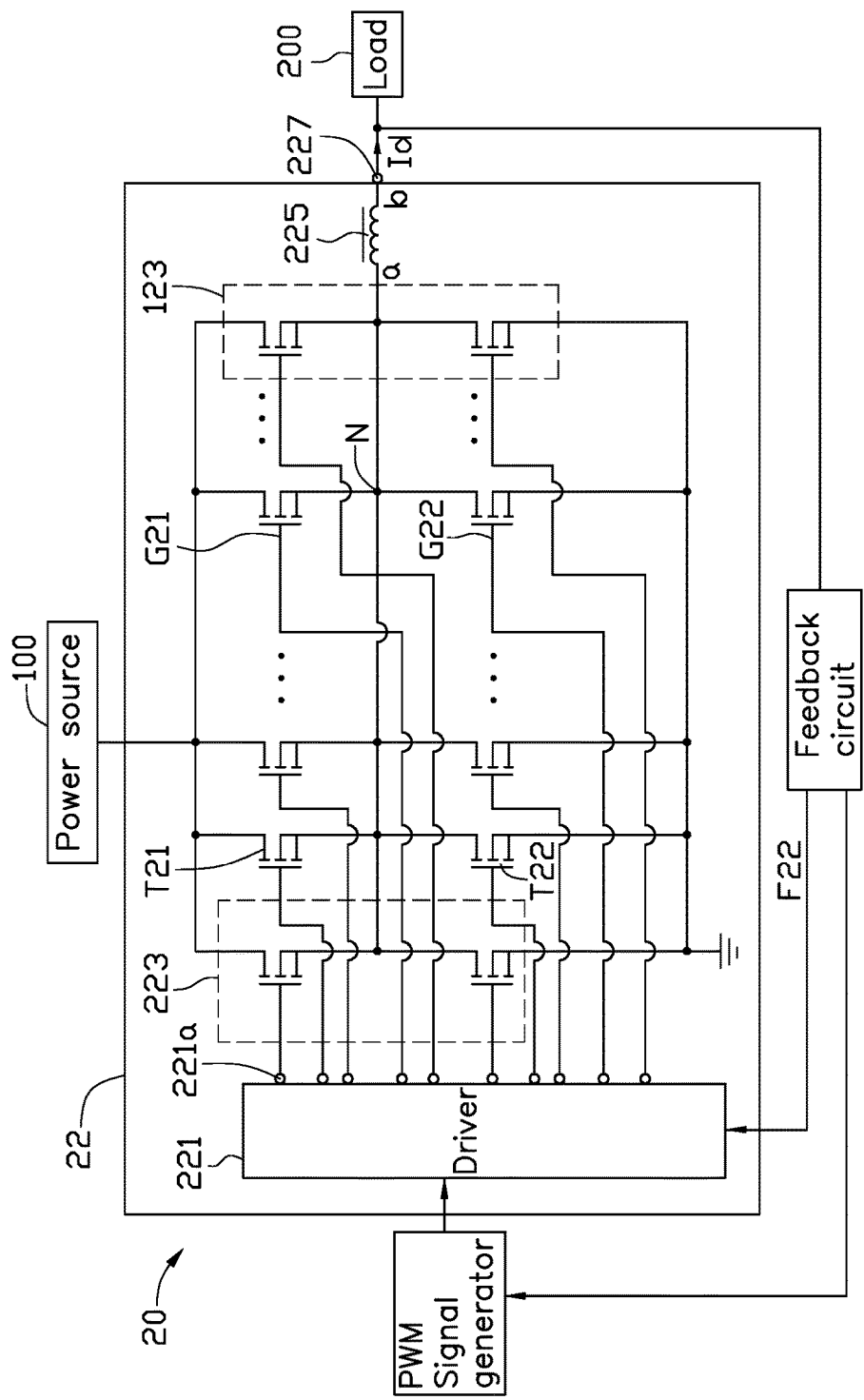
FIG. 2 is a circuit diagram of a second embodiment of a switching power voltage regulator.

FIG. 2 is a circuit diagram of a second embodiment of a switching power voltage regulator. Referring to FIG. 2, the switching power voltage regulator 20 is substantially the same with the switching power voltage regulator 10 of the first embodiment. But in the second embodiment, the connecting terminals G21 and G22 are connected to the output terminals 221a respectively. In the first embodiment, the switching power voltage regulator 10 regulates the first transistors T11 and the second transistors T12 according to the weight of the load 200, but in the second embodiment, the switching power voltage regulator 20 regulates the first transistors T21 and the second transistors T22 according to the power of the load 200. The driver 221 regulates a load current Id outputting to the load 200 according to the second feedback signal F22 expressing a power of the load 200.

The higher the power of the load 200, the more first transistors T21 are turned on by the driver 221 to change the inductor 225, and the more second transistors T22 are turned on by the driver 221 to discharge the inductor 225 according to the second feedback signal F22. On the contrary, the lower the power of the load 200, the less first transistors T21 are turned on by the driver 221 to change the inductor 225, and the less second transistors T22 are turned on by the driver 221 to discharge the inductor 225 according to the second feedback signal F22. Preferably, the driver 221 turns the first transistors T21 and the second transistors T22 on alternately of one inverter 223 to charge or discharge the inductor 225.

It is believed that the discussed embodiments and their advantages will be understood from the foregoing description, and it will be apparent that various changes may be made thereto without departing from the disclosure or sacrificing all of its material advantages. The embodiments discussed herein do not limit the following claims.

What is claimed is:

1. A switching power voltage regulator for regulating electric energy to a load, the switching power voltage regulator comprising:

a pulse width modulation signal generator configured to generate a pulse width modulation (PWM) signal;

an output circuit configured to receive the PWM signal to provide an output voltage according to the PWM signal, and to supply the output voltage to the load;

a feedback circuit configured to provide a first feedback signal and a second feedback signal based on the load, the first feedback signal being supplied to the PWM signal generator, and the second feedback signal supplied to the output circuit according to the output voltage to express a power of the load;

wherein the PWM signal generator is further configured to regulate the PWM signal according to the first feedback signal, the output circuit is further configured to regulate a load current output to the load according to the second feedback signal;

wherein the output circuit comprises:

an output end providing the output voltage to the load;

an inductor comprising a first connecting end and a second connecting end, the second connecting end connected to the output end;

a plurality of inverters, each of the inverters comprising a first transistor and a second transistor, the first transistor comprising a control terminal, a first connecting terminal and a second connecting terminal, the second transistor comprising a control terminal, a first connecting terminal and a second connecting terminal, the first connecting terminal of the first transistor connected to a power source, the second connecting terminal of the second transistor being grounded, the second connecting terminal of the first transistor connected to the first connecting terminal of the second transistor, an output node defined between the second connecting terminal of the first transistor and the first connecting terminal of the second transistor, each of the output nodes of the inverters connected to each other, the first connecting end of the inductor connected to the output nodes of each inverter; and a driver connected to the control terminals of the first transistors and the second transistors, the driver receives the second feedback signal from the feedback circuit, the driver determines a number of corresponding first transistors to be switched on based on the second feedback signal, and the driver controls a conducting time of the corresponding first transistors switched on according to the PWM signal at a time that the inductor needs to be charged;

wherein the driver comprises a plurality of output terminals to transmit a plurality of control signals, the first transistors of the inverters define a plurality of first switching groups, a number of the first transistors in each of the first switching groups are different and greater than one, the second transistors of the inverters define a plurality of second switching groups, a number of the second transistors in each of the second switching groups are different and greater than one, the control terminals of the first transistors in same first switching groups are directly connected to a same one of the output terminals of the driver to respectively receive same control signal; and the control terminals of the second transistors in same second switching groups are directly connected to another one of the output terminals of the driver to respectively receive same control signal.

2. The switching power voltage regulator of claim 1, wherein when the inductor needs to be charged, the driver selects one of the first switching groups based on the second feedback signal, switches on all of the first transistors in the first switching group selected based on the second feedback signal, and controls a switching-on time of the corresponding first transistors according to the PWM signal;
the first switching groups being selected is depended on the number of the first transistor in response to the second feedback signal;
the driver controls the first transistors in a greater number of the first switching groups to be switched on in response to the second feedback signal generated based on that the load becomes heavier;
when the inductor needs to be discharged, the driver further selects one of the second switching groups based on the second feedback signal, switches on all of the second transistors in the second switching group selected based on the second feedback signal, and control a conducting time of corresponding second transistors switched on according to the PWM signal.

3. The switching power voltage regulator of claim 2, wherein a number of the corresponding first transistors switched on is regulated by the second feedback signal according to a power of the load.

4. The switching power voltage regulator of claim 3, wherein the number of the corresponding first transistor switched on increases with the power of the load.

5. The switching power voltage regulator of claim 4, wherein a number of the corresponding second transistors switched on is regulated by the second feedback signal according to the power of the load.

6. The switching power voltage regulator of claim 5, wherein the number of the corresponding second transistors switched on increases with the power of the load.

7. The switching power voltage regulator of claim 6, wherein the driver is further configured to control the corresponding first transistors to charge the inductor, and control the corresponding second transistors to discharge the inductor at a time that the load is in a constant state.

8. The switching power voltage regulator of claim 7, wherein the driver is further configured to switch on the first transistors and the second transistors alternately of one inverter to charge or discharge the inductor.

9. A switching power voltage regulator for regulating electric energy to a load, the switching power voltage regulator comprising:
a pulse width modulation signal generator configured to generate a pulse width modulation (PWM) signal;
an output circuit configured to receive the PWM signal to provide an output voltage according to the PWM signal, and to supply the output voltage to the load;
a feedback circuit configured to provide a first feedback signal and a second feedback signal based on the load, the first feedback signal being supplied to the PWM signal generator, and the second feedback signal being supplied to the output circuit according to the output voltage to express a weight of the load;
wherein the PWM signal generator is further configured to regulate the PWM signal according to the first feedback signal,
the output circuit is further configured to regulate a load current output to the load according to the second feedback signal;
wherein the output circuit comprises:
an output end providing the output voltage to the load;
an inductor comprising a first connecting end and a second connecting end, the second connecting end is the output end;
a plurality of inverters, each of the inverters comprising a first transistor and a second transistor, the first transistor comprising a control terminal, a first connecting terminal and a second connecting terminal, the second transistor comprising a control terminal, a first connecting terminal and a second connecting terminal, the first connecting terminal of the first transistor connected to a power source, the second connecting terminal of the second transistor being grounded, the second connecting terminal of the first transistor connected to the first connecting terminal of the second transistor, an output node defined between the second connecting terminal of the first transistor and the first connecting terminal of the second transistor, each of the output nodes of the inverters connected to each other, the first connecting end of the inductor connected to the output nodes of each inverter, the first transistors of the inverters define a plurality of first switching groups, a number of the first transistors in each of the first switching groups are different and greater than one, the second transistors of the inverters define a plurality of second switching groups, a number of the second transistors in each of the second switching groups are different and greater than one; and
a driver connected to the control terminals of the first transistors and the second transistors, the driver receives the second feedback signal from the feedback circuit, wherein the driver comprises a plurality of output terminals to transmit a plurality of control signals;
the control terminals of the first transistors in same first switching groups are directly connected to a same one of the output terminals of the driver to respectively receive same control signal, and the control terminals of the second transistors in same second switching groups are directly connected to another one of the output terminals of the driver to respectively receive same control signal;
wherein when the inductor needs to be charged, the driver selects one of the first switching groups based on the second feedback signal, switches on all of the first transistors in the selected first switching group based on the second feedback signal, and controls a switching-on time of a corresponding first transistors according to the PWM signal;
the first switching groups being selected is depended on the number of the first transistors in response to the second feedback signal;
the driver controls the first transistors in a greater number of the first switching groups to be switched on in response to the second feedback signal generated based on that the load becomes heavier.

10. The switching power voltage regulator of claim 9, wherein when the inductor needs to be discharged, the driver further selects one of the second switching groups based on the second feedback signal, switches on all of the second transistors in the second switching group selected based on the second feedback signal, and controls a conducting time of a corresponding second transistors switched on according to the PWM signal.

11. The switching power voltage regulator of claim 10, wherein a number of the first switching groups switched on is regulated by the second feedback signal according to a weight of the load.

12. The switching power voltage regulator of claim 11, wherein the number of the first switching groups switched on increases with the weight of the load.

13. The switching power voltage regulator of claim 12, wherein a number of the second switching groups switched on is regulated by the second feedback signal according to the weight of the load.

14. The switching power voltage regulator of claim 13, wherein the number of the second switching groups switched on increases with the weight of the load.

15. The switching power voltage regulator of claim 14, wherein the driver is further configured to control a corresponding first switching groups to charge the inductor, and control a corresponding second switching groups to discharge the inductor at a time that the load is in a constant state.

16. The switching power voltage regulator of claim 15, wherein the driver is further configured to switch on the first switching groups and the second switching groups alternately of one inverter to charge or discharge the inductor.

* * * * *